United States Patent
Prandi

(10) Patent No.: US 9,743,596 B1
(45) Date of Patent: Aug. 29, 2017

(54) OPERATION SET FOR A MOBILE TOOL-BEARING HEAD FOR AGRICULTURAL OPERATION MACHINERY

(71) Applicant: Santiago Miguel Prandi, Córdoba (AR)

(72) Inventor: Santiago Miguel Prandi, Córdoba (AR)

(*) Notice: Subject to any disclaimer, the term of this patent is extended or adjusted under 35 U.S.C. 154(b) by 0 days.

(21) Appl. No.: 15/136,597

(22) Filed: Apr. 22, 2016

(51) Int. Cl.
  *B05B 3/00* (2006.01)
  *A01G 25/09* (2006.01)
  *A01C 23/04* (2006.01)
  *A01G 25/16* (2006.01)

(52) U.S. Cl.
  CPC .......... *A01G 25/092* (2013.01); *A01C 23/042* (2013.01); *A01G 25/09* (2013.01); *A01G 25/16* (2013.01)

(58) Field of Classification Search
  CPC ...... A01G 25/09; A01G 25/092; A01G 25/16; A01C 23/042
  USPC ....... 239/569, 578, 722, 726, 728, 727, 738, 239/750
  See application file for complete search history.

(56) References Cited

U.S. PATENT DOCUMENTS

| | | | |
|---|---|---|---|
| 1,966,783 A * | 7/1934 | Balaam | A01G 25/09 239/578 |
| 3,326,232 A | 6/1967 | Stamps et al. | |
| 4,842,204 A * | 6/1989 | Debruhl, Jr. | A01G 25/09 239/726 |
| 4,928,889 A * | 5/1990 | Lucas | A01G 9/247 239/726 |
| 5,246,164 A | 9/1993 | McCann et al. | |
| 5,678,771 A | 10/1997 | Chapman | |
| 6,666,384 B2 | 12/2003 | Prandi | |
| 2002/0005443 A1 * | 1/2002 | Drechsel | A01G 25/092 239/728 |

* cited by examiner

*Primary Examiner* — Steven J Ganey
(74) *Attorney, Agent, or Firm* — Greer, Burns & Crain, Ltd.

(57) ABSTRACT

An operation set is provided for a mobile tool-bearing for agricultural operation machines, which allows for the application of phytosanitary products or the survey of information from a crop surface formed by the traveling of a self-impelled irrigation machine. The set includes a plurality of modules installed consecutively one after the other thus covering the whole length of the self-impelled irrigation machine, each one having a scanning tool that may be a nozzle and/or a sensor that applies the programmed dose as it is displaced along the section, and these modules being linked to each other by a motor cable covering all the length of an irrigation machine or the greenhouse, and which travels in both directions in an alternate manner, since the movement is achieved as the motor cable is linked to a synchronic belt on at least one point.

15 Claims, 14 Drawing Sheets

OPERATION SET FOR A MOBILE TOOL-BEARING HEAD FOR AGRICULTURAL OPERATION MACHINERY

BACKGROUND

Field of the Invention

The present invention relates to the field of machinery, devices, apparatuses and arrays used in agro-industry, greenhouses, and more particularly of a mobile tool-bearing head including a tool for several works, in agricultural operation machines, such as at least one nozzle for application of variable doses of phytosanitary products and/or at least one sensor for scanning of crop information.

Even when the present description refers to a mobile tool-bearing head that uses a tool such as nozzles for the application of phytosanitary products, it should be clear that this does not imply that the invention is limited to such a use, instead, the head may use another tools such as different types of sensors for information scanning, either independently or jointly with the nozzle with no inconveniences.

Description of Prior Art

Generally, the main types of self-propelled irrigation machines that may operate with a pulverization system are: central pivot, linear displacement machineries and machines to irrigate corners that are coupled to central pivots, deploying and folding as the central pivot moves away from the tangent and gets near it, which are referred to in the art as "Corner".

One of said machines may be the one disclosed in Patent Document U.S. Pat. No. 3,326,232 which teaches an irrigation apparatus for application of agrochemicals with irrigation water, wherein water is used for the transport of chemical products such that the water source is in contact with chemical products when the mixture is applied on the field. However, by the use of said machine irrigation may be run from a water source contamination. Also, not all agrochemicals can be used because they are excessively diluted in water, and also, chemical products may be applied only when the apparatus is functioning in the conventional irrigation mode.

Another machine may be the one disclosed in Patent Document U.S. Pat. No. 5,246,164 issued to McCann, et al., which discloses an apparatus and a method for dividing the field to be irrigated by an irrigation system into a plurality of zones that may be controlled for irrigation water and the chemical requirements and then, through the irrigation system, delivering the appropriate amount of irrigation water or chemical products to each zone as defined above. The apparatus includes a plurality of sprayers independently controlled by valves sensitive to control modules, which are electronically interconnected with data acquisition and control unit to activate or deactivate the sprayers. Field maps are generated by a programmed microprocessor that determines the current position of each independent sprayer, then the microprocessor sends the information recorded in the control system which in turn sends these signals to various data acquisition and control modules. However, this system, as well as the US Document above, also shows the drawback of a possible contamination of water source, since some chemical products cannot be used due to their unsuitably high dilution volumes in water.

Still another machine may be the one disclosed in Patent Document U.S. Pat. No. 5,678,771 issued to Chapman John A., which discloses a chemical product distribution system for use with a mobile irrigation system made of a vertical adjustable, liquid chemical product supply line, seated on the irrigation system and which is in operating communication with the chemical liquid pressurized source. A liquid chemical product distribution line is place under the chemical product supply line, being these connected thereto with a remotely controlled valve. While the problem associated with the use of water for application of chemical products has been enhanced by this system, other drawbacks are still there, such as the need to regulate all sprayers in a particular manner, high minimum application doses, a very high number of sprayers lacking a suitable cleaning circuit, and the need to perform the manual adjustment when doses should be modified. Also, this system does not function with corner machines and the sprayer may only be used on this machine.

Still another machine can be the one disclosed in Patent Document U.S. Pat. No. 6,666,384, by the same holder of this application, which teaches an apparatus and method for the application of phytosanitary liquids on a field, wherein the apparatus comprises a plurality of irrigation units including nozzles for the application of an adjustable amount of liquid on the field, driving devices to move the irrigation unit on the ground, a system for supplying the liquid to the nozzles and a control circuit to control the functioning of nozzles in order to apply variable doses to the irrigation unit nozzles, the control circuit comprising a computer unit for the receipt of introduced data and to operate the control circuit, and being a control module independently on each irrigation unit, a plurality of sensors for detecting various parameters of the unit and an interface module connecting the independent control modules and the computer unit therebetween. Even though the machine of Document U.S. Pat. No. 6,666,384 has shown to function correctly in practice, the use of a huge amount of nozzles generates a series of inconveniences during functioning. One of them has been observed when at least one of nozzles fails or is defective. That is, by having a big amount of nozzles, the determination of which is failing and the processing times to perform said detection are difficult, they are usually long and involve significant delays and additional costs.

As for the methods known for the application of agrochemical products, we find the use of self-impelled machines or sprayers. At least one person is needed to operate the machinery exposing it to products that are toxic and harmful to human beings. These machines in turn generate an undesirable compaction on soil and damage crops as they run the field with their wheels. They are also unable to perform the control on all culture stages since they are developed at height and in repeated opportunities these machines do not have enough space to run on them.

The use of irrigation equipment injecting agrochemicals with the water used for irrigation is also a sometimes method which is no inaccurate and harmful for environment since the flow of water and chemical products is distributed on ground through the irrigation machine sprayers. When it is use for fertilizers, this method does not show any problem since, even though the distribution of the fertilizer on the surface is not accurate, the application may be deemed acceptable. However, for the use of variable dose requiring a precise control in all nozzles on small areas, the method is not acceptable. In turn, the dissolution of the water rate needed in this method is unacceptable for most of agrochemicals such as herbicides, fungicides, insecticides, etc.

Therefore, it would be convenient to have a new system for the application of phytosanitary products and/or which allows for the survey of information on crops for mechanized irrigation machines, among others, without the above mentioned inconveniences and limitations and which is in agreement with the modern technique.

SUMMARY

Therefore, it is an object of the present invention to provide a new operation set to improve all the above mentioned inconveniences and to be able to be installed in a fixed or mobile self-impelled irrigation machine of any type, i.e., a central pivot machine or a linear movement machine, as well as corner machines, or even inside a greenhouse.

It is another object of the present invention to provide an operation set for spraying by means or phytosanitary products or to survey information from crops to a surface consisting of the self-impelled irrigation machine pathway on which it is installed.

It is another object of the present invention to provide an operation set that notably reduces the number of spraying nozzles or sensors.

It is still another object of the present invention to provide an operation set of a mobile tool-bearing head for agricultural operation machines of the type that are conveyed in a controlled manner on a ground extension, being the module formed by a propulsion module showing a propelling head on one end of the module which has at least one servomotor, and at least one guide head on the second opposite end of the module, being the synchronic belt mounted on a first pulley connected to said servomotor and a second pulley mounted on said guide head; at least one module operated when connected to said propelling module and jointly defining a scanning line; at least one motor cable connected to said synchronic belt and which extends forming a loop all along said operated module or the whole machine, and at least one mobile tool-bearing head mounted on said at least one motor cable.

BRIEF DESCRIPTION OF THE DRAWINGS

For better clarity and understanding of the object of the present invention, the same has been illustrated in various figures, in which the invention has been represented in one of the preferred embodiments, all as an example, wherein.

DETAILED DESCRIPTION

Figure 1:
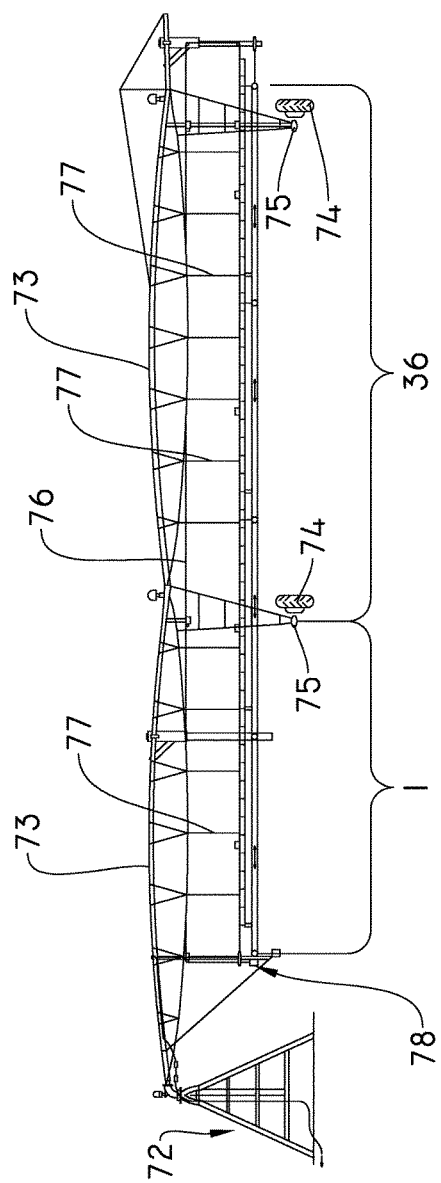
FIG. 1 shows an exemplary view of an irrigating machine with central pivot, in which the operating set according with the present invention may be used.
Figure 2:
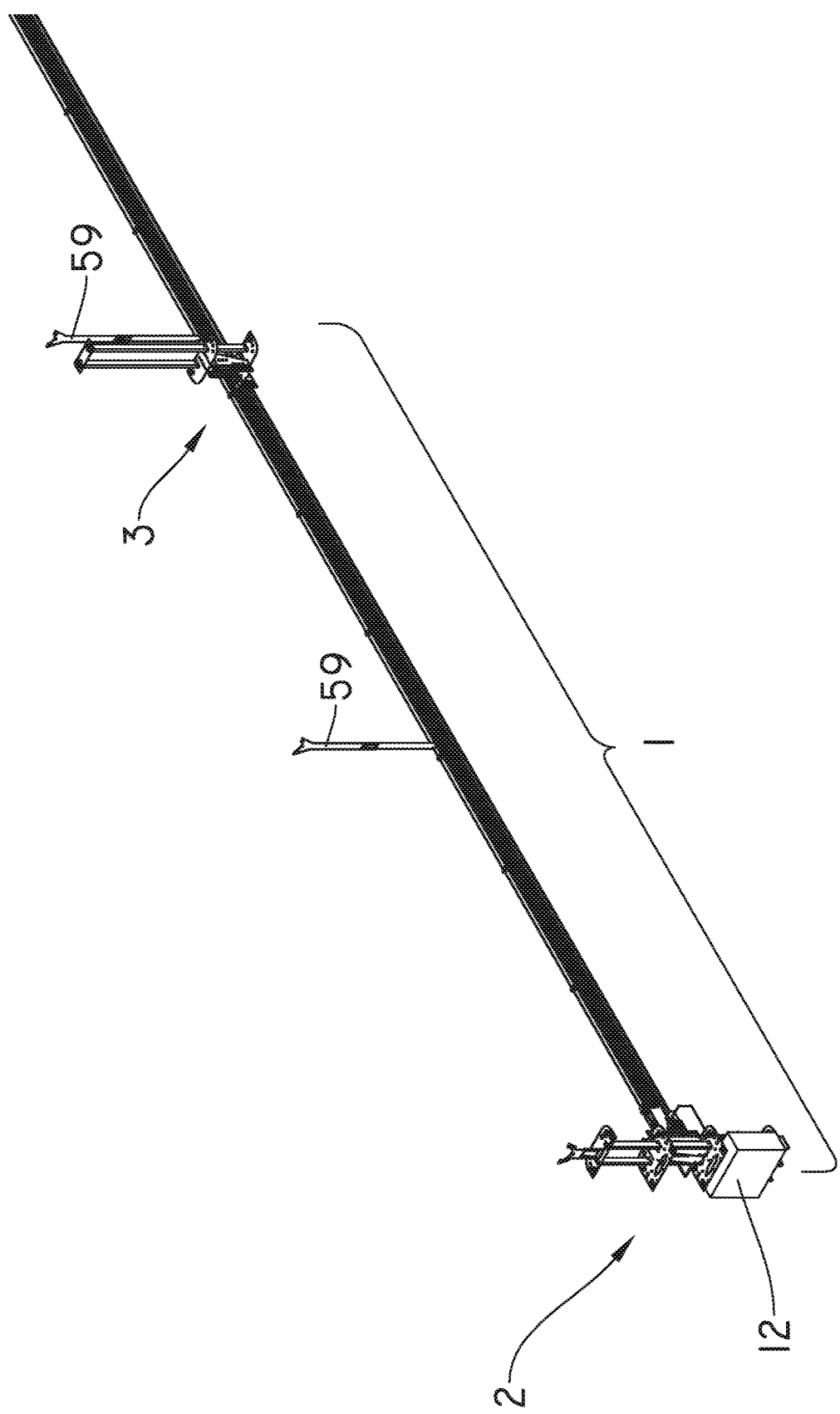
FIG. 2 shows a perspective view of a propulsion module of the operating set according to the present invention.
Figure 3:
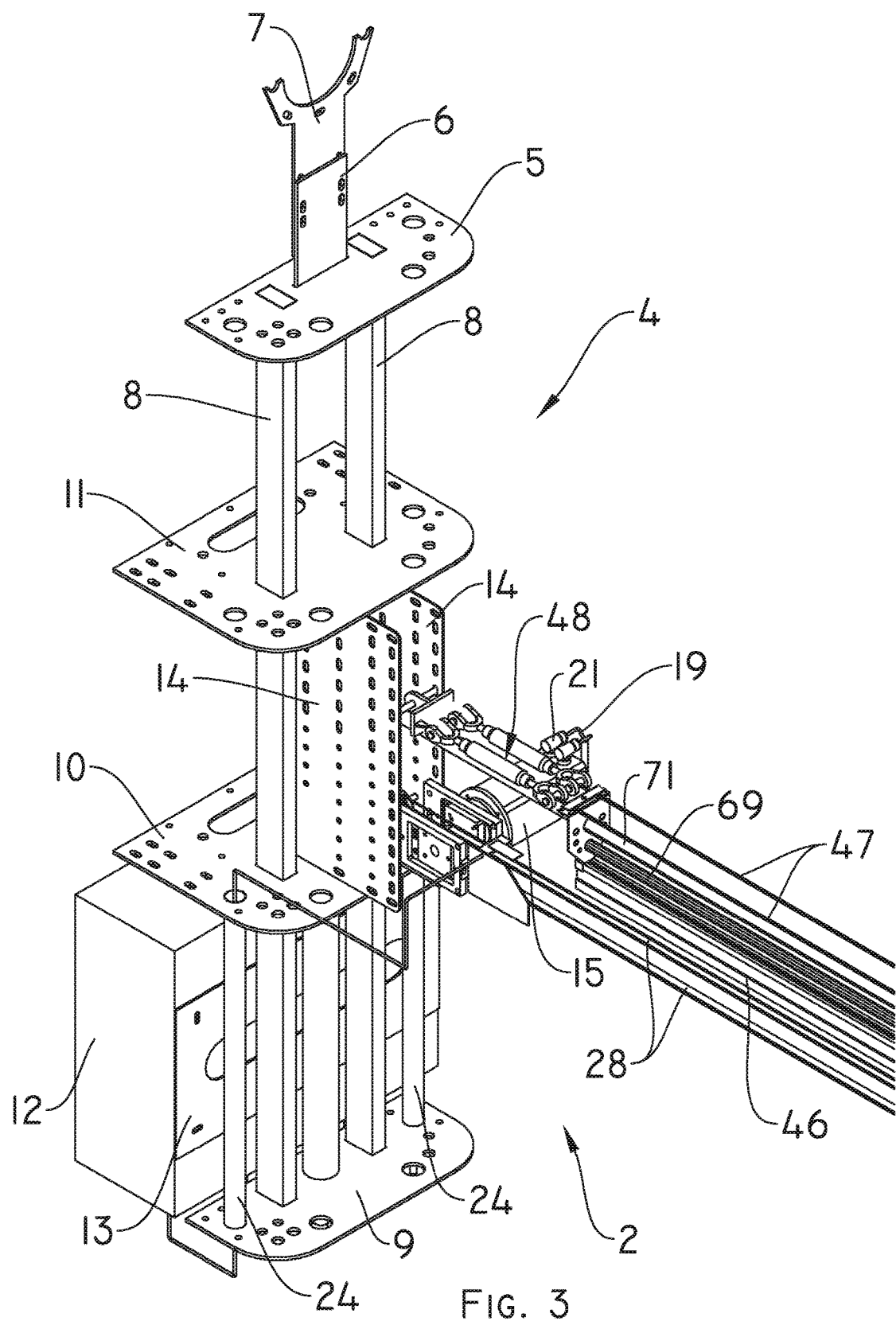
FIG. 3 shows a perspective view of a first end of a propulsion module of the operating set according to the present invention.
Figure 4:
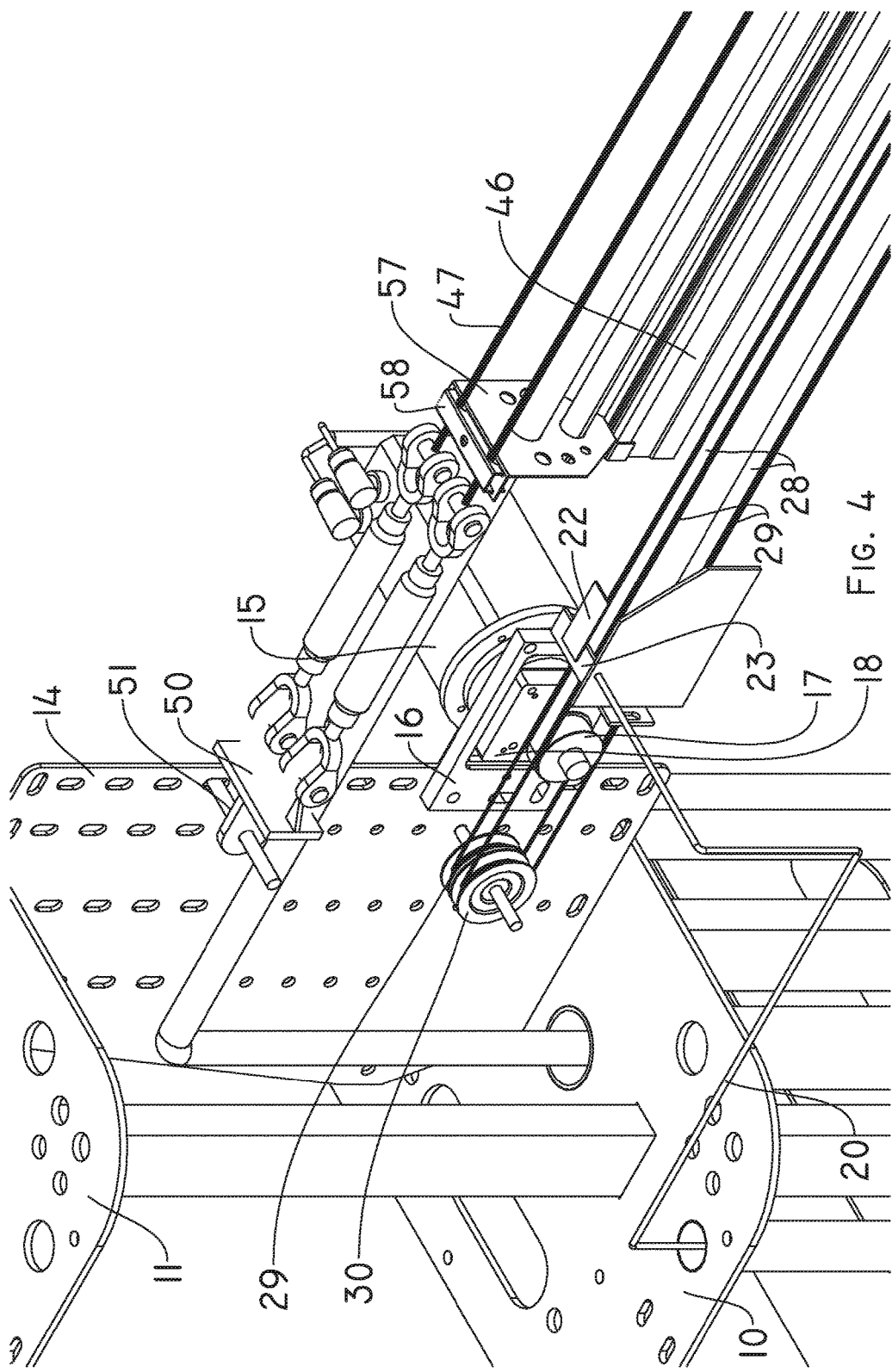
FIG. 4 shows a perspective and enlarged view of portion of the first end of FIG. 3 according to the present invention.
Figure 5:
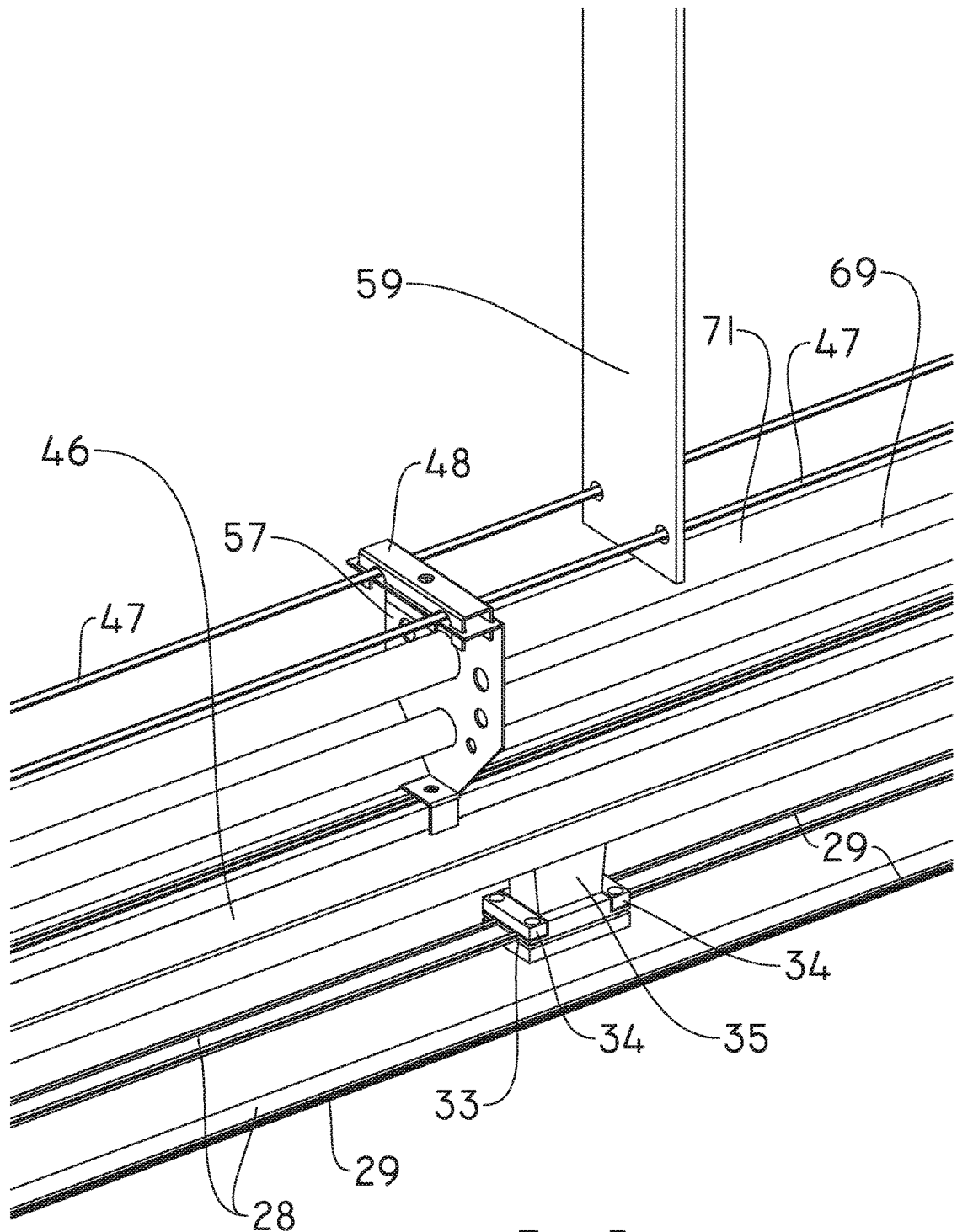
FIG. 5 shows a perspective view of a portion of the propulsion module according with the present invention, wherein a joining set is illustrated.
Figure 6:
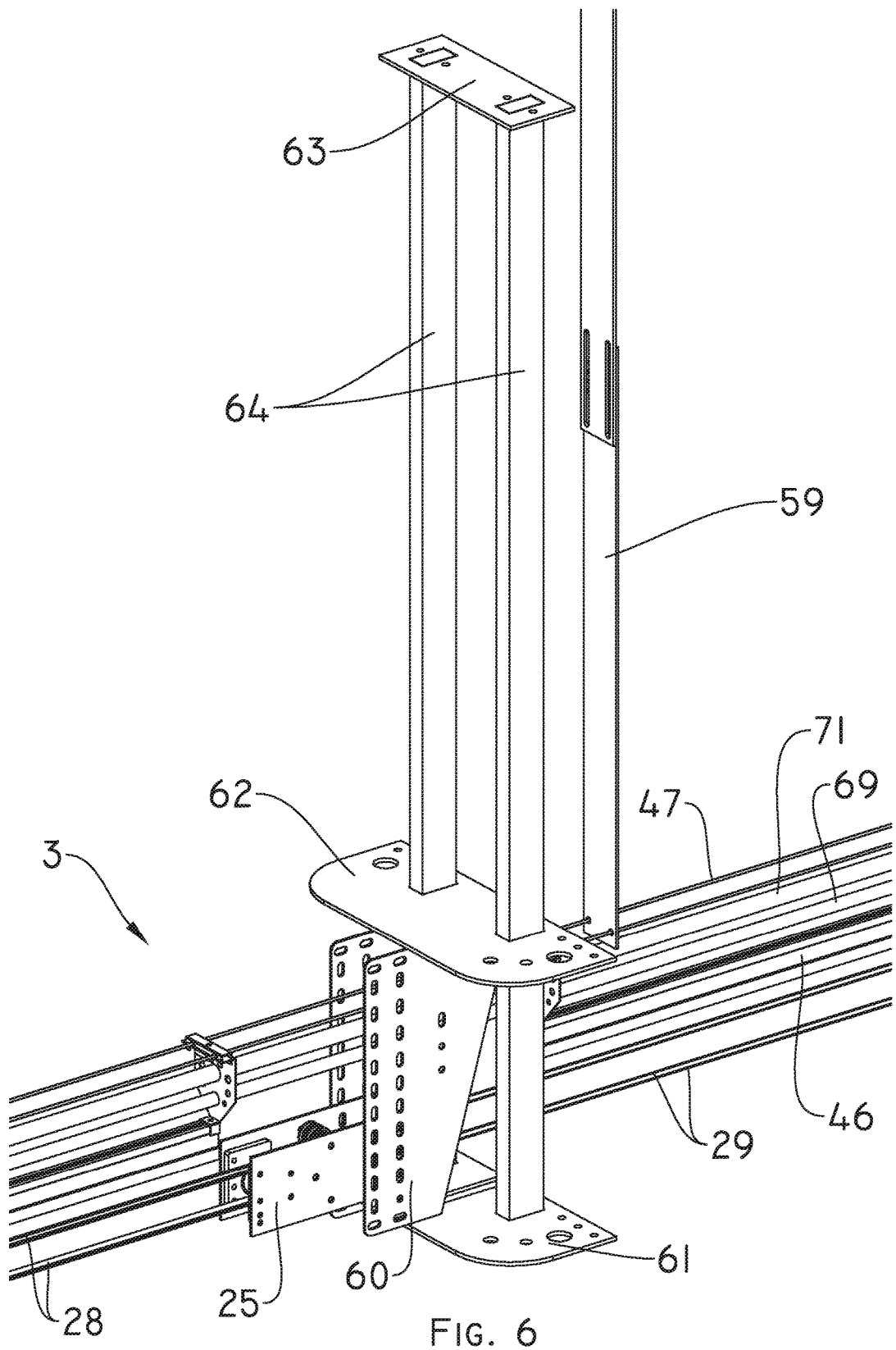
FIG. 6 shows a perspective view of a guiding head of the propulsion module according to the present invention.
Figure 7:
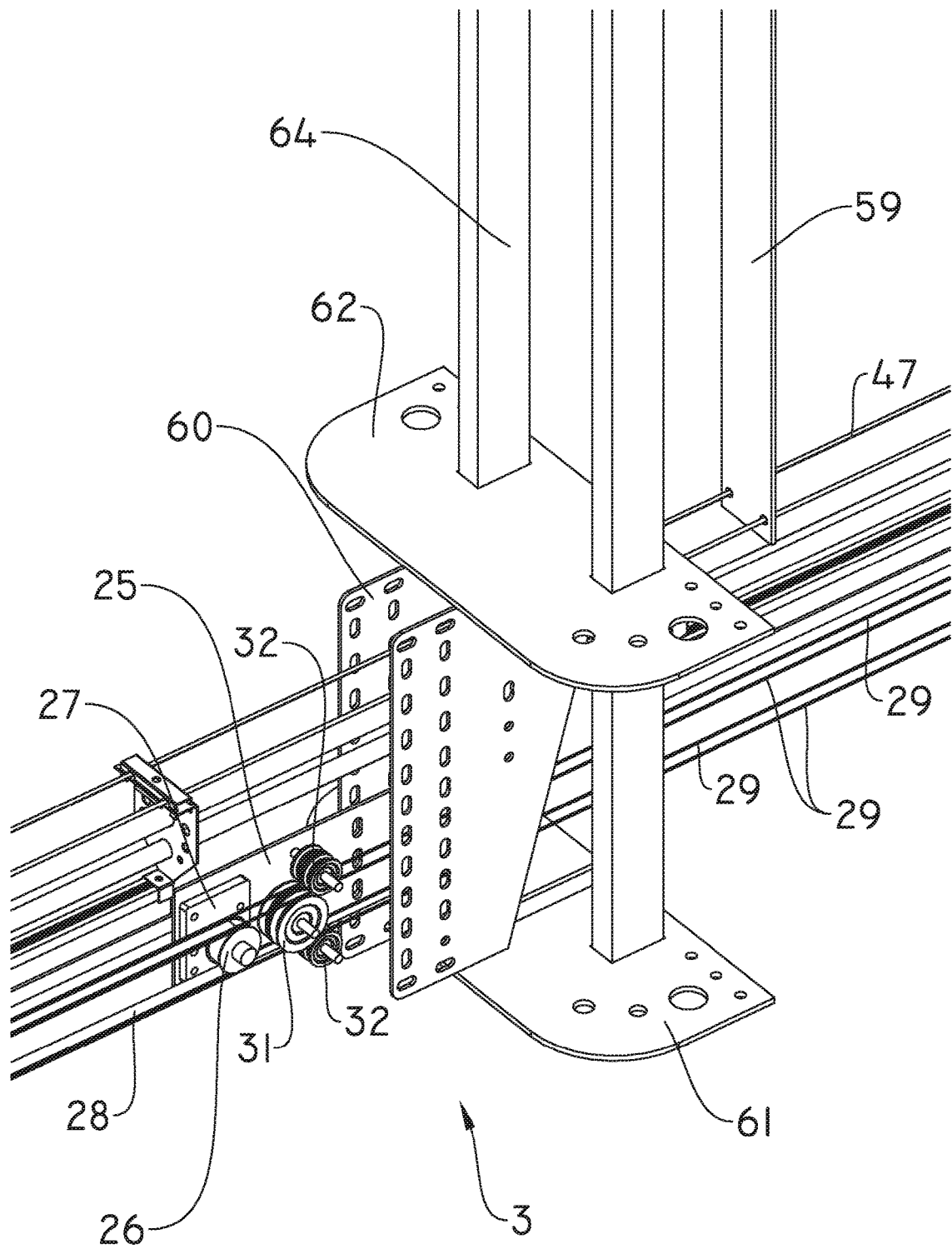
FIG. 7 shows a partial perspective and enlarged view of the guiding head of FIG. 6.
Figure 8:
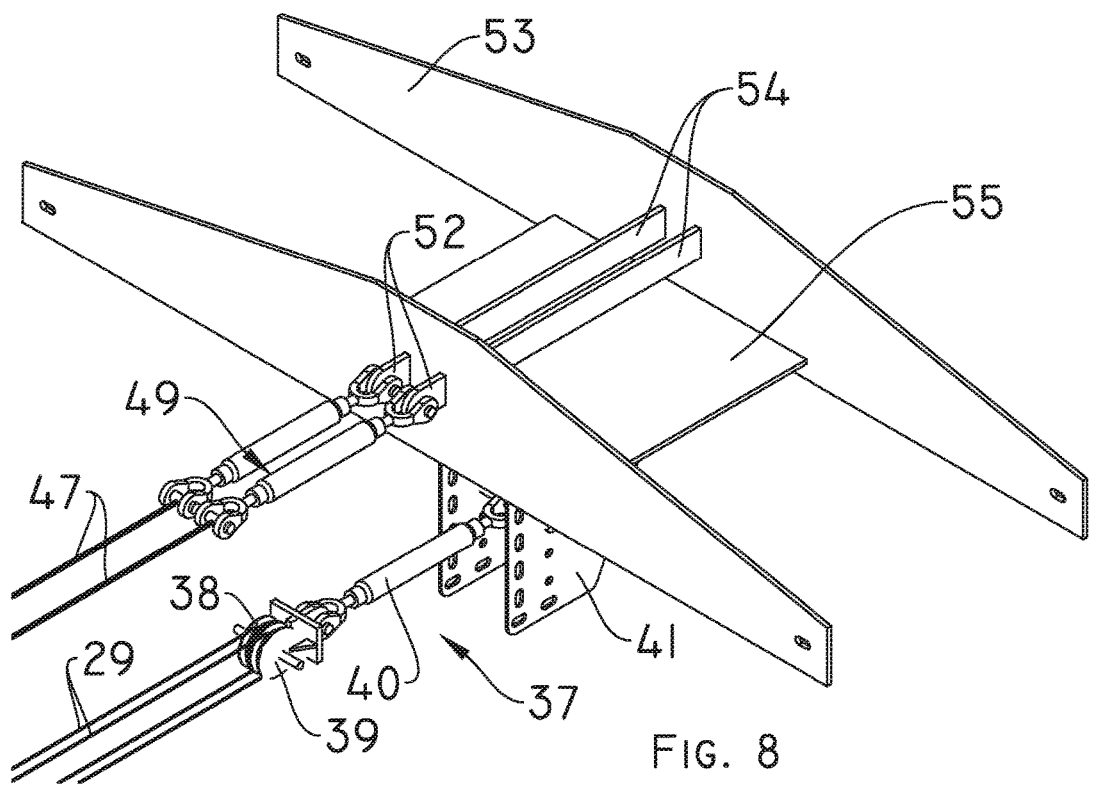
FIG. 8 shows a perspective view of a closing head of a module operated according to the present invention.
Figure 9:
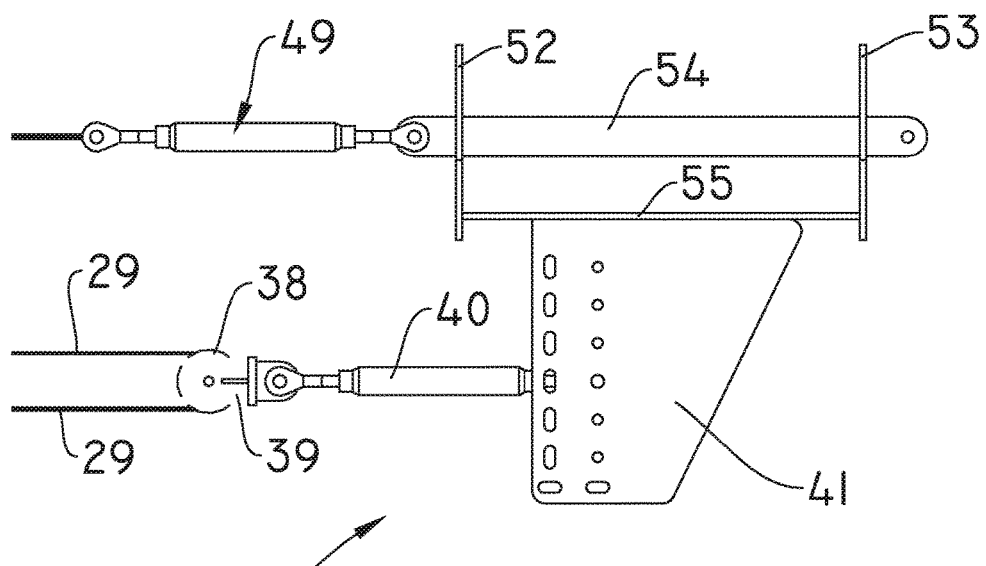
FIG. 9 shows a lateral view of the closing head of FIG. 8 according to the present invention.
Figure 10:
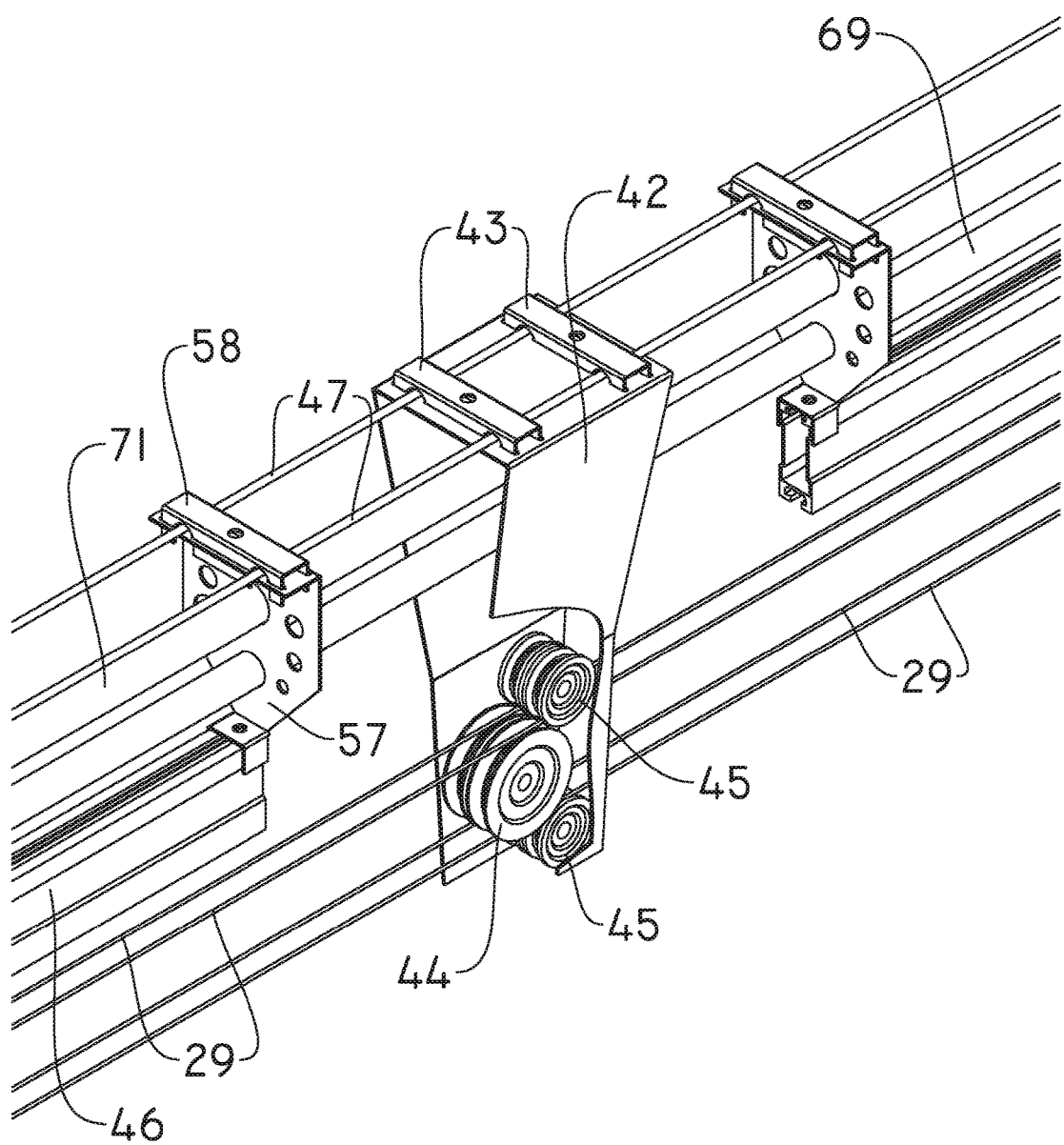
FIG. 10 shows a perspective, cross-sectional view of a guiding means according to the present invention.
Figure 11:
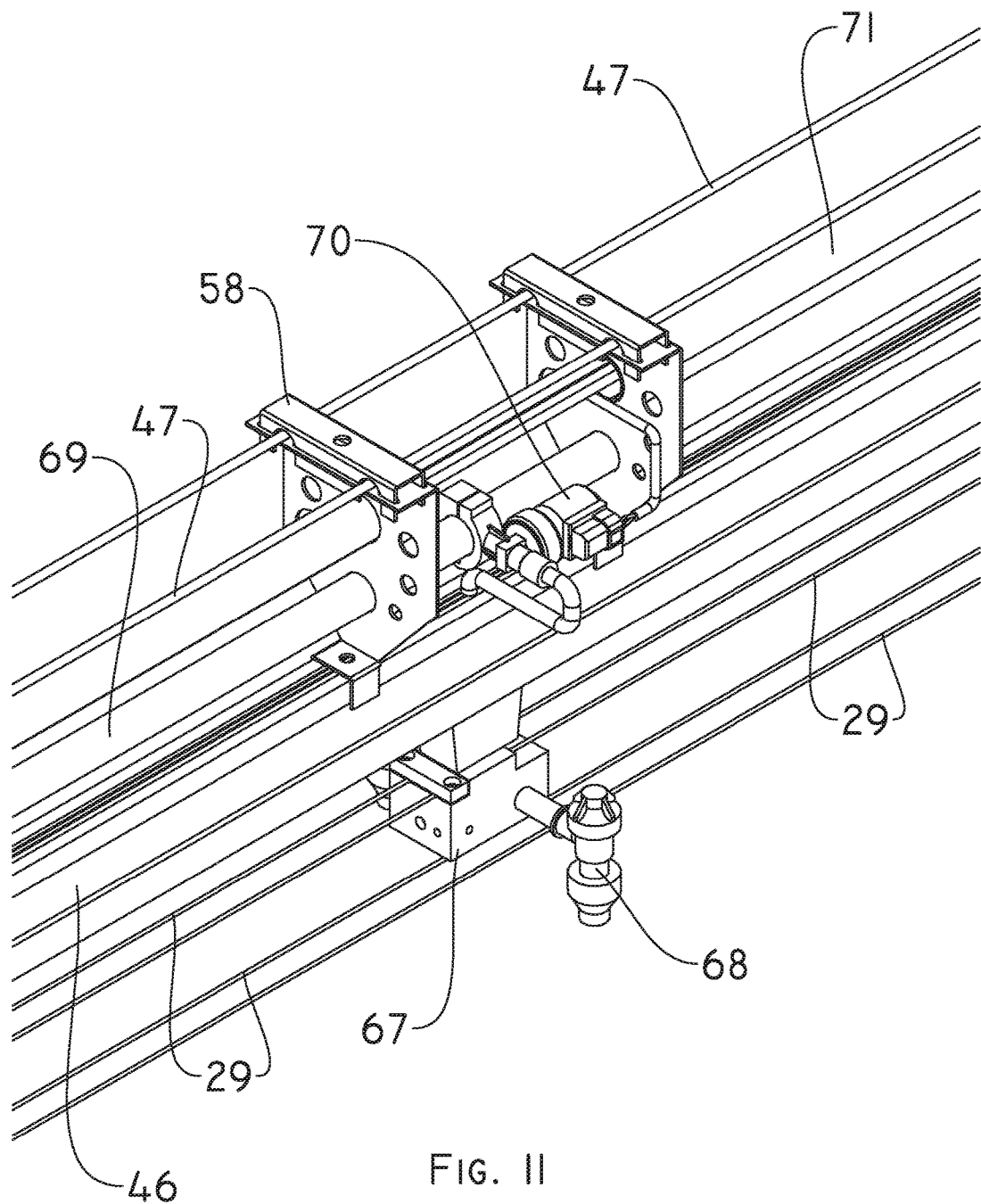
FIG. 11 shows a perspective view of a mobile tool-bearing head according to the present invention.
Figure 12:
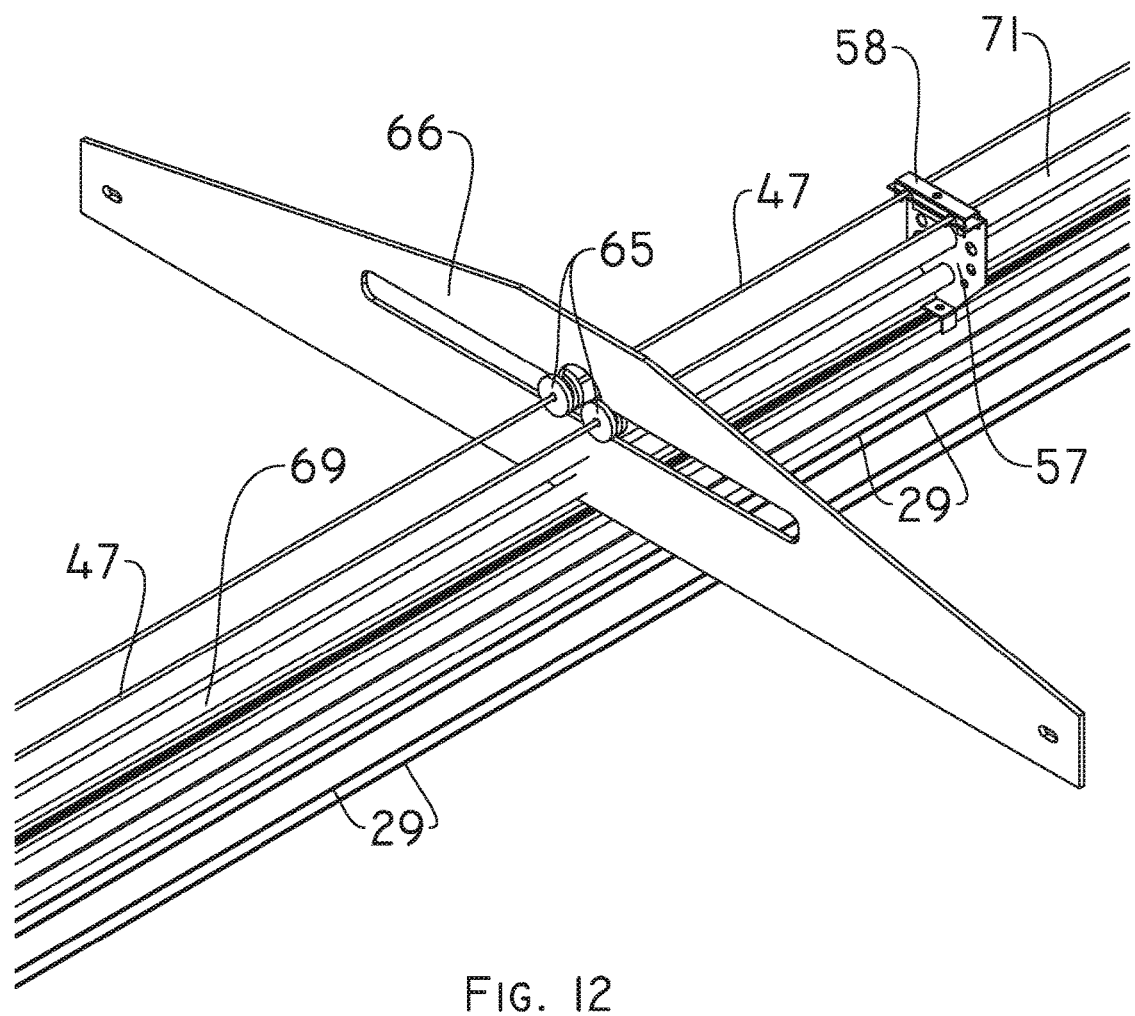
FIG. 12 shows a perspective view of some tower alignment plates according to the present invention.

Now with reference to figures, it is shown that the invention consists of a new operating set of a mobile tool-bearing head for agricultural operation machines, which improves the scanning process of the ground either for the application of variable doses of phytosanitary products and/or the scanning of information on culture through different sensors, being the invention applicable to irrigating machines self-impelled by a central pivot, frontal, lateral or Corner advance, as well as to greenhouses, and which notably reduces the number of nozzles and/or sensors used for such purposes.

First, as an example to facilitate the understanding and possible application of the set of the present invention, general reference will be made to a central pivot irrigation machine showing a pivoting tower or base 72 connected to a tank or deposit of phytosanitary liquid (not shown) through a pump (not shown). Likewise, said machine shows a pair of stretches or "SPAN" or irrigating units 73 and wheels 74 operated by operating means 75 which allow for the coordinated advance of each module, stretch or section which will be described below.

Now with reference to the present invention, and according to FIGS. 1 to 15, the operating set includes an impulsion module 1 which shows an impulsion head 2 and a guiding head 3. Wherein, said impulsion head 2 is mounted on a first end of the impulsion module 1 having a main tower 4 made of a support plate 5 which is welded to a vertical plate 6 thus forming a set that allows for the vertical displacement on a guiding plate 7 which is linked to an irrigating machine.

The tower structure 4 prolongs vertically through vertical supports 8 between which the plates 9, 10 and 11 are welded at different heights to form the main tower 4. Likewise, provided on a portion of said tower 4 is a main panel 12 mounted on a plate 13. The main control panel may read sensors to determine the suitable moment to perform the application and to control other functions for the system to apply the phytosanitary doses desired by the user or also to carry out the ground survey.

Two vertical plates 14 are welded on to plates 10 and 11, which serve to support the propulsion head bases 2. Wherein said propulsion head 2 comprises at least one servomotor 15 mounted on parallel plates 16 that are connected to plates 14, and which is connected to a first pulley 17 disposed between plates 18 with suitable bearings on its axis to facilitate turning.

It is noted that, the main panel 12 is linked to the servomotor 15 through some cables 19 which are embedded by a protection system 20 and enter the servomotor 15 through some connectors 21. Likewise, there is provided at least one proximity sensor 22 mounted on a base 23 and which is connected to the main panel 12 through a cable inside the ducts 24.

On the other hand, the guide head 3 is disposed on a second end of the propulsion module 1 and comprises a pair of lateral and parallel plates 25 between which a second pulley 26 is disposed, and mounted between plates 27. Therefore, between said first pulley 17 and said second pulley 26, a synchronic belt 28 is mounted operated by said first pulley 26 connected to the servomotor 15. The path of the synchronic belt 28 is established by said proximity sensor 22 which is an infrared light sensor that detects two marks thereon, being the distance between both marks equal to the length of the path of a mobile tool-bearing head inside the propulsion module or section.

Likewise, there is provided at least one motor cable 29 mounted on said first motor pulley 30 disposed on said propulsion head 2 and a second guide pulley 31 disposed on said guide head 3 which is accompanied by corresponding guide pulleys 32. Wherein, said motor cable 29 may comprise, in this embodiment, at least two cables linked in at least one point to said synchronic belt 28 by means of a linking set 33 which comprises a guide cart made at least of two plates 34 between which said motor cable 29 and synchronic pulley 28 are linked. Said linking set 33 is mounted on a lateral guide bar, as described below, through a support arm 35, thus allowing the synchronic belt to be aligned during displacement.

The present invention may also comprise at least one operated module 36 connected to said propulsion module and jointly defining a scanning line. Said operated module 36 comprises a first end connected to said guide head 3 which is disposed on the second opposite end of the propulsion module 1 and a second end that shows a guide tensor closing end 37 showing at least one closing pulley 38 for said motor cable 29 which extends, forming a ribbon with the synchronic belt, from the propulsion module all the way long through the operated module. Therefore, said motor cable is tensed between said first pulley and closing pulley and passes through the second guide pulley, thus passing through the whole self-impelled irrigation machine and being linked to at least one point at the synchronic belt to perform a linear movement in the installation sense in both ways at a variable speed. On the other hand, said closing pulley 38 is mounted between plates 39 which are in turn fixed to a pulley tensor 40 which is fixed to a pair of plates 41, thus allowing for the motor cable to be moved freely in both ways.

It is noted that, the set of the present invention may show a plurality of said operated modules 36, all aligned with said propulsion module 1 along said scanning line. In order to keep the linearity of the motor cable 29 along the operated modules, between them there is provided a cable guide means 42 having a top end supplied with clamps 43 and a lower end supplied with a primary guide pulley 44 and both secondary guide pulleys 45 disposed adjacent to the primary one 44 and which keep said motor cable 29 aligned.

It is noted that said propulsion module and each one of the operated modules are supplied with a guide bar 46 through which feeding hoses and connection cables can be passed there through to different devices and arrays used in the machine.

Figure 13:
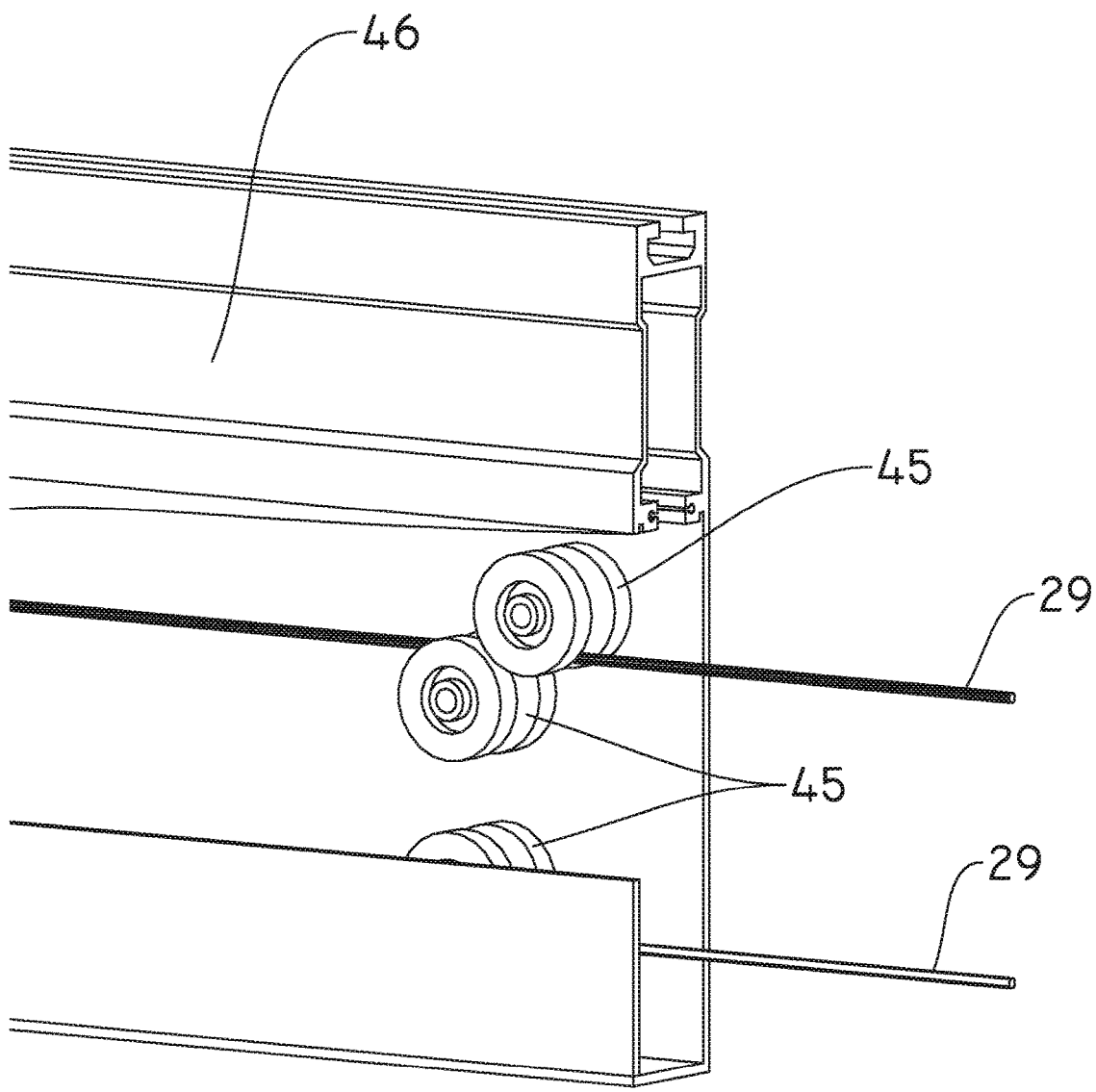
FIG. 13 shows a perspective view of another preferred embodiment of the guiding means according with the present invention, wherein said guiding means is part of a guiding bar.
Figure 14:
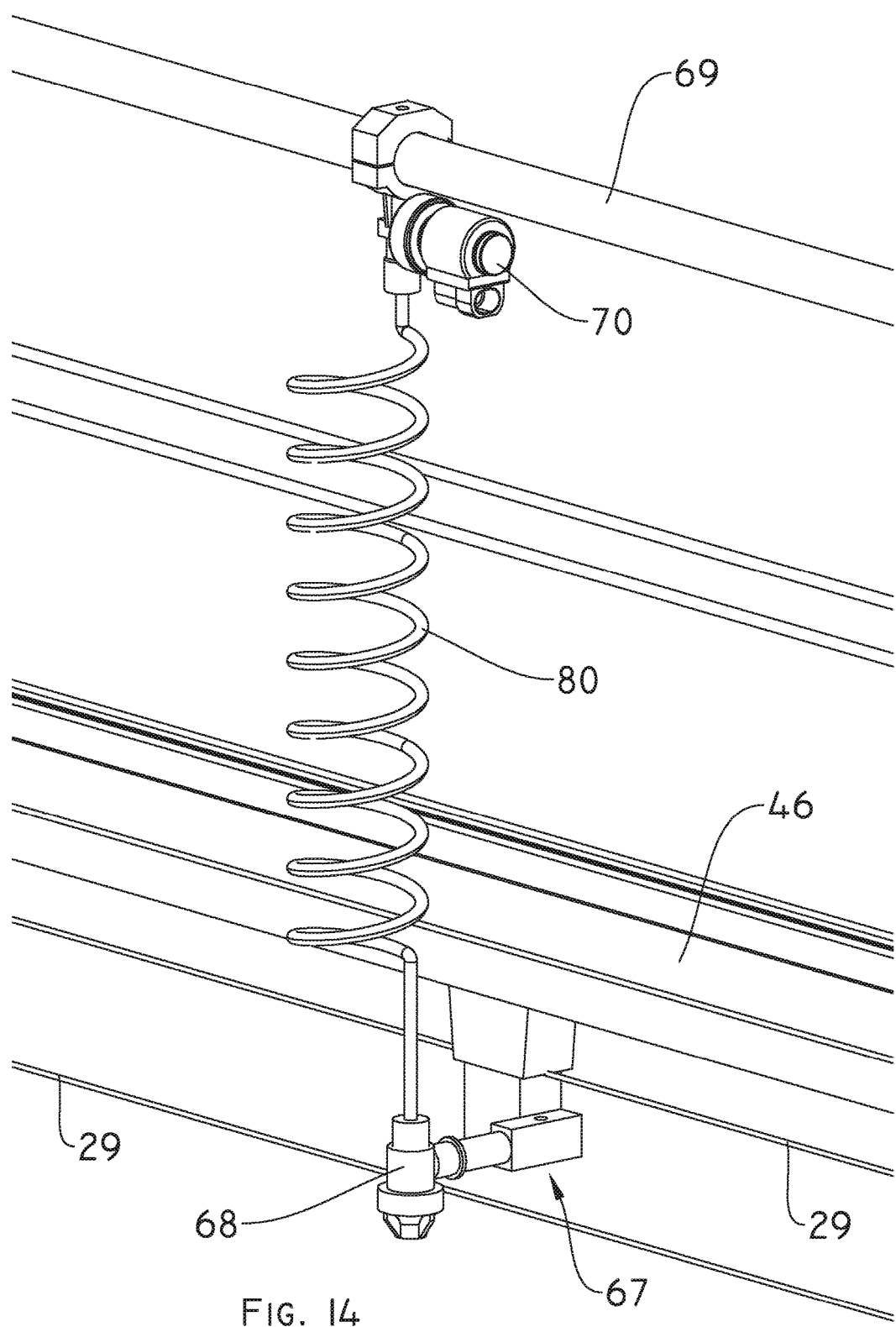
FIG. 14 shows a partial view of the operating set of the invention, which illustrates a phytosanitary product passing hose disposed outside the guiding bar.

Alternatively, and in another preferred embodiment, the guide bar 46 may extend downwards integrating the cable guide means 42, as better illustrated in FIG. 13. In this embodiment, but not as a limitation to the present invention, there are two secondary guide pulley sets 45 which are mounted on the side bar 46 allowing for the pass of a motor cable 29. This way, only nozzles and/or sensors are exposed outside the bar, while the other components of the set are saved and protected from outdoors, therefore prolonging their life.

In turn, said first pulley 17 and second pulley 26 are perforated and separated away by a distance equivalent to the stretch, section of propulsion module path. In turn, the main control panel 12 receives information of the sensors in order to determine the moment in which the servomotor 15 should act the synchronic belt 28. Being the belt 28 linked to the motor cable 29 that travels all the way long of the irrigation machine, it preforms the necessary alternated movement so that each spraying/sensor set performs the spraying or the collection of information. The main panel 12 includes the control of sensors that are part of the system and all the electronics needed to perform the turning on and off of the electric valves that feed the system section and will be described below. There is also a flow sensor and a pressure sensor to detect any feeding failure of propulsion and operated modules or sections.

Likewise, so support the propulsion and operation modules, there are at least two steel support cables 47 which are tensed by tensing sets 48 and 49, which are fixed to the propulsion head 2 and closing head 37, respectively, at each end. It is noted that said tensing set 48 is fixed to the propulsion head 2 by corresponding plates 50 and axis 51, while said tensing set 49 is fixed to the closing head 37 by means of a plate 52 fixed to a first closing plate 53 which, in turn, is parallel to a second closing plate 54 and are connected to each other through a pair of beams 55 and a horizontal plate 56. Likewise, to link the operated modules 36 to the support cables 46 fixing sets 57 are installed, which are linked to said cables 47 through clamps 58. These fixing sets 57 are installed at regular distances along the whole operating set of the present invention.

The whole set may be suspended from a lifting system to adjust the height of nozzles or sensors as regards their target. The lifting system comprises a main cable 76 on which a set of secondary cables 77 suspend the system totally. A manual or electrically operated spindle 78 displaces the main cable 76 to rise and lower the whole system. The secondary cables are fixed on an end to the irrigation machine structure, they pass through a simple pulley mounted on sections and fixed to the main cable on the other end thus dividing the effort in halves. In order for the main cable to keep the alignment on the irrigation machine structure, pulleys are installed on the structure for such a purpose.

In order to keep the support cables 47 alignment, they are linked to the irrigation machine structure on a regular basis through sets 59. Likewise, plates 25 of the guide head 3 are mounted, in turn, on some parallel plates 60 which allow the set of the invention for the necessary vertical displacement in order to align the synchronic belt 47 in parallel to the operated module 36 which guides it for displacement. In turn, the whole set of the invention is linked to the irrigation machine through some plates 61, 62 and 63 linked to each other by means of vertical bars 64. The support cables 47 include bushings 65 so that they are not damaged when they pass through the tower alignment plates 66.

On the other hand, the present invention may have at least one tool-bearing head 67 containing, preferably, a scanning tool 68, mounted on at least one motor cable 29. Wherein said scanning tool 68 may be a sensor, a detector, a scanner, or a pulverization/spraying nozzle for phytosanitary products to allow for the application of phytosanitary fluid on crop or to collect information on same. In case of the nozzle, its pulverization spectrum will be determined by the type of application to be performed.

This said, the servomotor turns in a sense and then in the other the necessary revolutions for the displacement of the synchronic belt all the way long equivalent at least one-fold the length of the propulsion module, while the length of the operated module will be said propulsion module length or a multiple of same. As an example, in case the operated module has double the length of the propulsion module, the operated module will include two tool-bearing heads which will be separated apart to each other a length equal to the one of the propulsion module. In turn, the synchronic belt linked to the motor cable installed all along the set forming a closed loop, allows the traveling of the scanning tools that are linked to the motor cable along the length of the operated module on which they are installed, therefore performing a movement in both displacement ways in a synchronized and alternated manner.

It is noted that each movement in one way or another of the servomotor 15 direction will be performed when the self-impelled irrigation machine has traveled the programmed distance to find again, under each section or module, a new area to pulverize or scan. This area should consider the overlapping required by the nozzle manufacturer to keep a suitable density and distribution of drops per surface units needed for the used phytosanitary product to cause the required intended effect.

Figure 15:
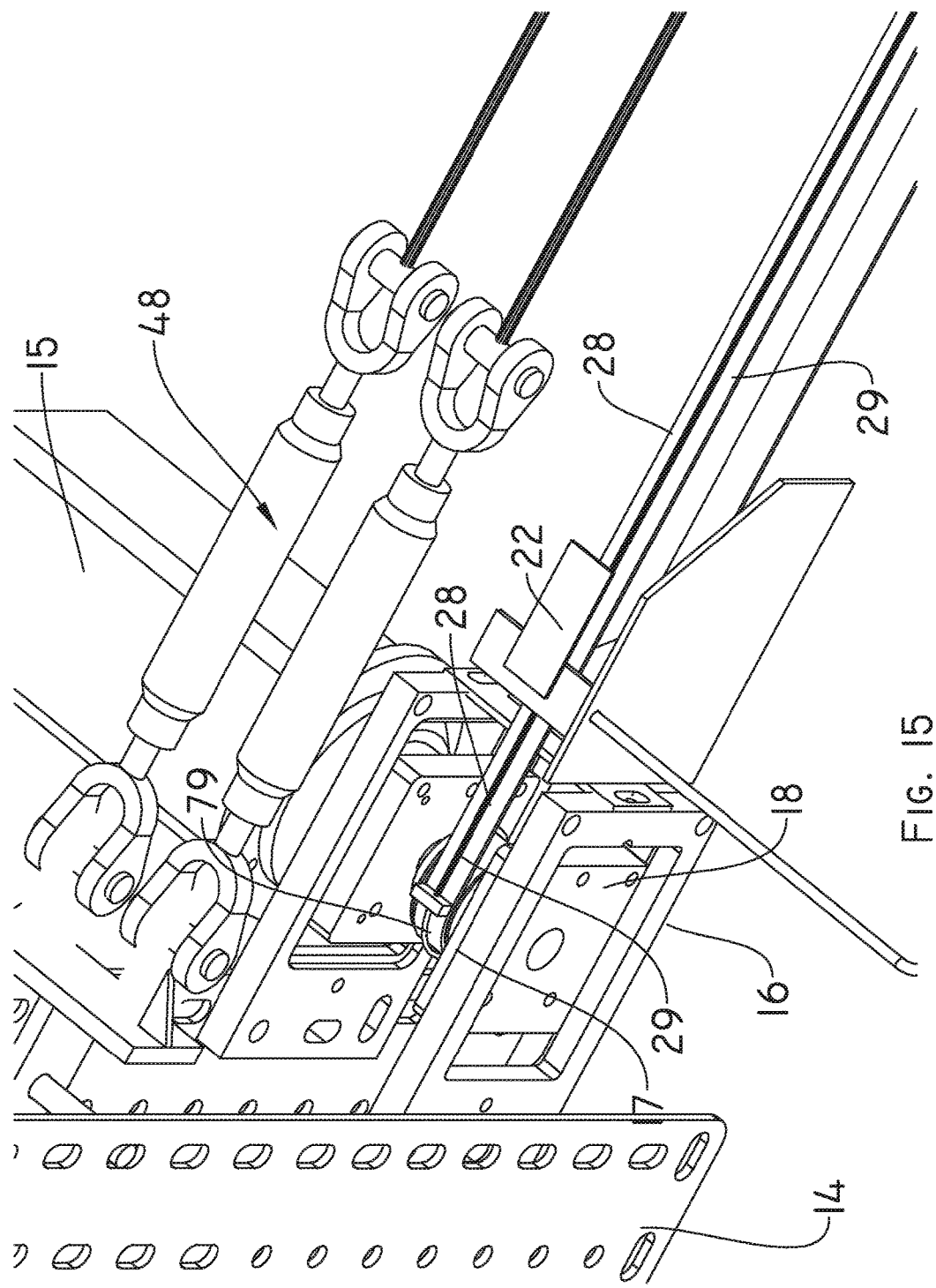
FIG. 15 shows a perspective, enlarged view of a portion of the impulsion module, which illustrates another preferred embodiment of the linking set according with the present invention.

In agreement with another alternate embodiment, in FIG. 15, and in order to reduce the length of the synchronic belt 28, the propulsion module will not have a tool-bearing head and will only operate as an impeller of the motor cable with a belt. As illustrated in FIG. 15, the motor cable is linked to the synchronic belt by means of the linking set which now comprises a clamp 79 that fixes the cable to a point or section of the belt by means of screws, for example. However, this does not imply that the invention is limited to said clamp, but other fixing means may also be considered and used to link said cable with the belt. This way, the motor cable 29 may be fixed to and supported on the back of the synchronic belt 28, and once they are linked, they turn around the first pulley 17, thus eliminating the use of pulley 30 and shortening the length of the synchronic belt.

Opposite to the first above described embodiment, in this embodiment the synchronic belt 28 performs a full travel between pulleys 17 and 26, i.e., the length or distance traveled by the synchronic belt is equivalent to twice the length of the propulsion module, any time the length of the operated module is the double or a multiple of the length of the propulsion module. As an example, but not as a limitation of the present invention, if the propulsion module has a length of 6 meters, the synchronic belt will have a length of 12 meters but the belt closed loop will have 6 meters, being the distance traveled by any point of the synchronic belt the length of an operated module. This way, the length of the synchronic belt is reduced without altering the object of the present invention. On other words, the clamp 79 defines a fixing point for the cable 29 on the belt and said point, during a turn of the belt, travels the whole length of the belt, i.e., all along the higher and lower stretches of the belt. That is why when the extension of the belt ribbon is, for example 6 meters, any point of cable will travel 12 meters.

As regards the phytosanitary product, it circulates on a main line 69 to the scanning tool or nozzle by means of a hose installed in the interior of the guide bar 46 or cable-bearing chain or a similar device. Alternatively, in FIG. 14, a main line 69 disposed on the higher part of the machine may feed a pendant, spiral outer hose 80, connected to the head 67 and nozzle 68, which may move freely accompanying the movement of the head 67. The passing of fluid through the hose is controlled with an electric valve 70 that may be installed on the main line 69 or on the tool or nozzle 68 in order to achieve a faster response at the opening and a stopping of spraying. It is noted that the cables of the electric valves 70 reach the main panel 12 through a duct 71.

In turn, a hydraulic circuit of phytosanitary products is provided comprising a pump for pressurizing the fluid up to the main line 69 which travels all the way of the irrigation machine. The dose may be determined by the number of paths effected by the spraying head on each surface, or by the speed at which it is displaced while covering all the path or due to the overlapping established by the coverage width between different consecutive paths or by the temporary interruption of the electrical valve supply or the pressure at which the fluid is supplied or by the partial or total combination of any of the above described methods.

The use of an electric valve allows for the independence of each operated module of the main line. All this is coordinated by a control circuit that records the irrigation machine movements, at the same time it has different sensors such as a flow meter to control that each spraying set is working within suitable flow ranges, a wind gauge to stop the application if wind is higher than the threshold determined by user as suitable to stop the application within the allowed drift ranges, a fluid pressure sensor to be applied in order to know if the pump is working correctly.

A command module for the electrical valves that would allow the fluid passing from the main line in a constant or intermittent manner if the requirement is to reduce the flow without variation of the speed or pressure, passing through the hose installed in the interior of the side bar, cable-bearing chain or a suitable device that allows for the travel along the module, finally reaching the scanning tool-bearing head that applies the dose established by the user on the surface formed by the section path and the coverage width of the spraying set. This is why each nozzle of each module applies phytosanitary product on the following immediate surface to the one receiving the last application.

In the case of using a sensor as scanning tool, at least one sensor will be available at each operated module to collect information on the state of crops, send this information to the main panel for interpretation through a data BUS going over the whole machine and link to panel 12 through a cable installed inside the guide bar, cable-bearing chain or similar device. This data BUS carries information from sensors installed at each operated module such that a crop situation map is formed in that moment.

In the event the set installed in each module carries a sensor and/or a spraying nozzle, the sensor sends the information to the BUS as it performs the displacement. In order for the application to be uniform or the acquisition of data to be correct on the whole surface formed by the machine displacement, its length is divided in operated modules or "sections" and these, in turn, are traveled by different sets of spraying nozzles/sensor at a constant, variable and/or intermittent speed. The ability of the flow to be interrupted several times by the time units is in order to reduce the application volume without having to modify the nozzle orifice or the working pressure. This may be performed since flow is supplied to the spraying set through an electrical valve.

Therefore, the present invention relates to an operating set for the application of variable doses of phytosanitary products, scanning of crop information through different sensors, etc., which is installed on a self-impelled irrigation machine with central pivot, frontal, lateral or Corner advance, or inside a greenhouse. More particularly, the invention refers to an apparatus comprising a central electronic control system which operates the turning on of the servomotor that generates the alternated movement in a direction and then in another direction at variable speed of the synchronic belt, which in turn is linked to the motor cable that synchronizes the movements of all operated modules forming the set of the invention.

Each operated module has at least one scanning tool or issuing/receiving set comprising said spraying/pulverization nozzle or sensor which, as it is displaced along the corresponding field section, pulverizes or collects information on crop over the area comprised between the length of the section and the coverage width of the nozzle/sensor forming the pulverization/sensor set. For the case of application of a phytosanitary product, and in order for this to reach the spraying nozzle, the set has an electrical valve for each operated module that allows for the passage of phytosanitary product from the main line to the pulverization nozzle/s.

The set of the present invention is able to be programmed and to contain a prescription map designed in advance according to the needs of the surface formed by the total coverage of the self-impelled irrigation machine on which the pulverization system is installed. This may have been performed by the same set if the corresponding sensors are installed on the tool of each module.

Basically, the control unit records the movements of the self-impelled irrigation machine, determines the position of each operated module, determines the dose to be applied on the surface corresponding to each section, or prepares the control unit to receive the information of said section and starts the servomotor which induces a movement to the synchronic belt and this, in turn, to the motor cable linking the pulverization/sensing heads and sends actuation signals to the corresponding electrical valves/sensors to be on during this cycle so that the nozzles located in each module or section perform the pulverization or so that they send information so sensors in case the set is located for such a purpose.

It is noted that, in order to understand the present specification, the term "phytosanitary products" means any type of fluid to be applied to a surface formed by the displacement of the structure of a self-impelled irrigation machine. The most common phytosanitary products are insecticides, herbicides, liquid fertilizers and the like, diluted in water, oil, crude, etc.

On the other hand, and as an illustration, during the operation of the irrigation machine, any failure should be detected in the pumping station, feeding hose, disconnection hose, rapid couplings, main line, data BUS and any of operated modules. Therefore, a flow sensor in installed that is used to detect the flow passing through the main line, which should match with the one used by the sum of operating sections at each cycle. A pressure sensor is installed at the beginning of the main line to be sure that the pressure is within suitable values for each spraying set having the corresponding nozzles installed at each module. A wind gauge is installed to assure that the wind speed is within suitable parameters for drift not to be excessive. It is possible to add sensors measuring other weather parameters such as ambient relative humidity, etc. This may be performed in order to select the best moments to perform the application.

The machine is placed at the starting point of the application or movement. Since the distance traveled by the machine in this moment is zero, the first cycle is performed. If no error appears, the cycle ends when all the operated modules have performed pulverization or collection of information through the sensor. The software follows the machine's movements. If a different dose is desired on each module or section, at each cycle doses should be assigned to each module in agreement with a prescription map.

In case of large machines that may show simultaneous shots or for the case the application requires a higher uniformity, the advance or movement of the irrigation machine may be interrupted to perform them sequentially. For the control of errors, if needed to guarantee the appropriate performance of pulverization when a fail sequence occurs, the set immediately stops pulverization and emits an alert signal. The optimal distance between shots will be calculated based on the parameters of nozzles used in the spraying set.

To obtain a uniform distribution of product on field, each section should have been displaced the distance equivalent to the width of coverage of the nozzle used in the spraying set, minus the correct overlapping. This is determined with a projection of a distance of vector in a direction perpendicular to the vector corresponding to the section of nozzle. Mathematically, if t is the line defined by nozzles of the nozzle section, p1 and p2 are consecutive positions of the center of the section and a is the angle formed between the vector difference (p2–p1) and a line perpendicular to t, the cumulative distance is:

$$(p2-p1)\cdot\cos(\alpha)$$

This calculation provides a uniform application for the whole operated module, independently of the type of movement performed by the module, whether this movement is lineal or radial or if it corresponds to a corner path. The applied dose is defined by the displacement speed of spraying nozzle along the path performed in the module on which it is installed. In turn, dose may be modified by varying the working pressure, overlapping of different stretches covered by the section and also intermittently interrupting the electrical valve supply.

On the other hand, and as an example, based on a radius span of 400 meters, conventional pulverization systems or irrigation machines should use about 400 pulverization nozzles or sensors to perform pulverization or the survey of the ground under them. However, by the set of the present invention with at least one scanning tool per each operated module and taking into account that each module may have a length form 12 meters to 24 meters, the total number to be used varies between 16 and 32 nozzles/sensors, this being a great advantage over the prior art conventional machines. Also, in case of malfunctioning failure, due to a lower number of nozzles or sensors, the invention easily allows for the detection of the failing valve or sensor, this not being possible with conventional machines, since it is very difficult to find the failing nozzle among the great number of wing nozzles.

This way, the mobile tool-bearing head operation set for agricultural machines of the present invention is envisioned and made, which allows to apply phytosanitary products or the information survey from a crop surface formed by the path of the machinery, either on a field section or inside a greenhouse.

Wherein, the set is comprised of a plurality of modules which are installed consecutively one after the other, thus covering all the length of the self-impelled irrigation machine, each one having a scan tool that may be a nozzle and/or a sensor which, as it is displaced along the operated module or section, applies the programmed dose. These modules are linked to each other by a motor cable that covers all the self-impelled irrigation machine, being this cable movable in both directions in an alternate manner, and the movement is achieved as the motor cable is linked to the synchronic belt in at least one point.

In turn, said synchronic belt is operated by a servomotor in a precise manner, all this coordinated from the control panel receiving information on the displacement of the self-impelled irrigation machine as this is performed and determines the moments at which the servomotor should perform a new displacement of the synchronic belt so that the scanning tool travels along the whole module applying the dose programmed by the user.

The displacement of the pulverizing set along the module may have different speeds, thus allowing the dose to be suitable at each passage point. The scanning tool is linked to a main line of phytosanitary liquids and/or data BUS through a hose and/or cable installed inside the guide bar, cable-bearing chain or a similar device, or outside it, on the other end having an electrical valve which is started and stopped when the scanning movement is initiated and terminated on the surface comprised of the length of the module and the width of pulverization of the pulverizing nozzle.

In order to modify the dose applied to each surface in an independent manner on each module or section, the application should be performed from a module at a time, and more than one passage should be performed on the surface, or the speed of the displacement of pulverizing set may be modified, or the fluid working pressure may be modified. In case the flow applied by each module is desired to be reduced without having to perform independent applications from each one of them, micro-interruptions may be performed by the electrical valve to the fluid supply reaching the pulverizing nozzle.

It is noted that, in case the operation set of the present invention is used in a greenhouse, the tool-bearing head may have an arm provided with a plurality of nozzles which displaces along the surface to be pulverized with the phytosanitary product. This does not imply that the invention, in case of being used in a greenhouse, is limited to said configuration, instead other configurations may be considered and used with the set of the present invention with no inconvenience.

The invention claimed is:

1. An operating set of a mobile tool-bearing head for agricultural operation machines, which travel in a controlled manner on a ground extension or a greenhouse, the set comprising:

a propulsion module having:

i) a propulsion head on a first end of the propulsion module which propulsion head has at least one servomotor, and ii) at least one guide head on a second opposite end of the propulsion module, iii) a synchronic belt mounted between a first pulley connected to said servomotor and a second pulley mounted on said guide head;

at least one operated module connected to said propulsion module and jointly defining a scanning line;

at least one motor cable connected to said synchronic belt and which motor cable extends forming a ribbon along said propulsion and operated modules; and at least a mobile tool-bearing head having a tool, mounted on said at least one motor cable on said at least one operated module.

2. The set according to claim 1, wherein said at least one mobile tool-bearing head is mounted on said at least one motor cable on said at least one operated module and on the propulsion module.

3. The set according to claim 1, further comprising a first pulley on said propulsion head, a second guide pulley on said guide head, and a closing pulley connected, by at least one pulley tensor, to a guide tensor closing head disposed on one of said ends of said at least one operated module, the motor cable being tensed between said first pulley and the closing pulley and passes on a guided manner through at least said second guide pulley.

4. The set according to claim 1, wherein said guide head has two guide pulleys through which said motor cable passes in a guided manner.

5. The set according to claim 1, wherein said synchronic belt and said motor cable are linked on at least one point by a linking set.

6. The set according to claim 5, wherein said linking set comprises a guide cart comprising two plates between which said motor cable and said synchronic belt are linked.

7. The set according to claim 5, wherein said linking set comprises at least a clamp that fixes said motor cable to a section of the synchronic belt.

8. The set according to claim 1, wherein said operated module comprises a first end, connected to said guide head located on the second opposite end of the propulsion module, and a second end having said guide tensor closing end head.

9. The set according to claim 1, wherein the set comprises a plurality of said operated modules, with all of them aligned with said propulsion module along said scanning line.

10. The set according to claim 9, further comprising at least one cable guiding means between said operated modules, wherein said cable guiding means has a lower end provided with a primary guide pulley and two secondary guide pulleys located adjacent to the primary guide pulley.

11. The set according to claim 10, wherein said cable guiding means is mounted within said guide bar.

12. The set according to claim 1, wherein said propulsion module and each one of the operated modules are provided with a guide bar within which feeding hoses and connection cables are arranged.

13. The set according to claim 1, further comprising a guide bar, and feeding hoses outside the guide bar and connected to said tool-bearing head.

14. The set according to claim 1, wherein said tool is at least one sensor.

15. The set according to claim 1, wherein said tool is at least one nozzle for spraying a phytosanitary product.

* * * * *